(12) United States Patent
Sokolov

(10) Patent No.: US 6,901,591 B1
(45) Date of Patent: May 31, 2005

(54) FRAMEWORKS FOR INVOKING METHODS IN VIRTUAL MACHINES

(75) Inventor: Stepan Sokolov, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 781 days.

(21) Appl. No.: 09/703,361

(22) Filed: Oct. 31, 2000

(51) Int. Cl.⁷ ................................................. G06F 9/00
(52) U.S. Cl. ........................ 718/1; 719/316; 719/332; 718/107
(58) Field of Search ........................... 718/1, 100, 102, 718/108; 719/312, 313, 316, 330, 332, 317, 315; 713/1; 797/116; 707/200

(56) References Cited

U.S. PATENT DOCUMENTS

| | | | |
|---|---|---|---|
| 4,086,626 A | | 4/1978 | Chung |
| 4,910,731 A | | 3/1990 | Sakurai et al. |
| 5,418,964 A | | 5/1995 | Conner et al. |
| 5,815,718 A | | 9/1998 | Tock |
| 5,899,997 A | | 5/1999 | Ellacott |
| 5,920,720 A | | 7/1999 | Toutonghi et al. |
| 6,003,038 A | * | 12/1999 | Chen ...................... 707/103 R |
| 6,072,953 A | | 6/2000 | Cohen et al. |
| 6,081,665 A | * | 6/2000 | Nilsen et al. ............... 717/116 |
| 6,096,095 A | | 8/2000 | Halstead |
| 6,151,618 A | | 11/2000 | Wahbe et al. |
| 6,151,703 A | | 11/2000 | Crelier |
| 6,163,780 A | | 12/2000 | Ross |
| 6,202,208 B1 | | 3/2001 | Holiday, Jr. |
| 6,205,578 B1 | | 3/2001 | Grove |

(Continued)

FOREIGN PATENT DOCUMENTS

EP          0 996 059 A2        4/2000

OTHER PUBLICATIONS

Chang, Da–Wei et al., "EJVM: an economic Java run–time environment for embedded devices", *Software Practice and Experience*, 2001, John Wiley & Sons, vol. 31, No. 2, pp. 129–146. XP–000987539.

(Continued)

*Primary Examiner*—Majid A. Banankhah
(74) *Attorney, Agent, or Firm*—Beyer Weaver & Thomas, LLP

(57) ABSTRACT

Improved frameworks for implementing class files that are particularly useful in virtual machine based computing systems will be described. In one aspect of the invention, each method within a class file is associated with a corresponding "reference cell." The reference cells typically include sufficient information to facilitate the invocation of the corresponding method. By way of example, each reference cell may include a class pointer field, a method name field, a signature field and potentially other fields. In another aspect of the invention, a process for loading class files into a virtual machine based computing system is described. Each method invocation within the class file is translated into an internal invocation that references a reference cell associated with the internal class representation that contains the method. The use of such reference cells has the potential in many circumstances to improve the performance of the virtual machine as well as potentially reduce the memory requirements of the internal class representations. In yet another aspect of the invention, each method invocation in a class file is reviewed during loading to determine whether a reference cell currently exists for its associated method. When it is determined that a reference cell does not currently exist for a method associated with a selected method invocation, a new reference cell is created for the selected method. The newly created reference cell is then associated with the internal class representation that contains the method (which may or may not be different than the internal class representation that contains the method invocation). In some embodiments, the class file is an internal class representation that represents a Java class and does not include a Constant Pool.

23 Claims, 7 Drawing Sheets

Constant Pool Section to Reference A Method

| | | |
|---|---|---|
| 10: | class_index=11, name_type_index=12 | CONSTANT_Methodref |
| 11: | name_index=13 | CONSTANT_Class_info |
| 12: | name_index=14, decsriptror_index=15 | CONSTANT_NameAndType |
| 13: | length, pointer to class name srting | CONSTANT_Utf6_info |
| 14: | length, pointer to method name srting | CONSTANT_Utf6_info |
| 15: | length, pointer to signature srting | CONSTANT_Utf6_info |
| 16: | | |

U.S. PATENT DOCUMENTS

| | | | | |
|---|---|---|---|---|
| 6,292,883 | B1 | | 9/2001 | Augusteijn et al. |
| 6,317,872 | B1 | * | 11/2001 | Gee et al. .................... 717/152 |
| 6,330,709 | B1 | | 12/2001 | Johnson et al. |
| 6,332,215 | B1 | | 12/2001 | Patel et al. |
| 6,338,160 | B1 | | 1/2002 | Patel et al. |
| 6,339,841 | B1 | | 1/2002 | Merrick et al. |
| 6,372,286 | B1 | * | 4/2002 | Azuma et al. ................. 427/79 |
| 6,434,694 | B1 | * | 8/2002 | Slaughter et al. .............. 713/1 |
| 6,442,753 | B1 | | 8/2002 | Gerard et al. |
| 6,446,084 | B1 | * | 9/2002 | Shaylor et al. ............. 707/200 |
| 6,496,871 | B1 | * | 12/2002 | Jagannathan et al. ....... 719/317 |
| 6,553,565 | B2 | * | 4/2003 | Click et al. ................. 717/129 |
| 6,557,023 | B1 | * | 4/2003 | Taivalsaari .................... 718/1 |
| 6,557,054 | B2 | | 4/2003 | Reisman |
| 6,571,388 | B1 | | 5/2003 | Venkatraman et al. |
| 6,584,612 | B1 | | 6/2003 | Mueller et al. |
| 6,643,711 | B2 | * | 11/2003 | Bracha et al. .............. 719/315 |
| 6,704,803 | B2 | * | 3/2004 | Wilson et al. .............. 719/315 |
| 6,738,977 | B1 | | 5/2004 | Berry et al. |

OTHER PUBLICATIONS

Gosling, James et al., "The Java™ Language Specification", 1996, *The Java™ Language Specification*, Chapter 12 Execution, pp. 215–236. XP–002032923.

Lindholm et al., "The Java™ Virtual Machine Specification—Second Edition", 1999, *Addison–Wesley*, pp. 117–132. XP–002254151.

Qian, Zhenyu et al., "A Formal Specification of Java™ Virtual Machine Instructions", 1997, *Technical Report, Universität Bremen*, pp. 1–32. XP–002255760.

Robert Griesemer, entitled "Utilizing a Program Counter With One or More Data Counters For Executing Instructions," U.S. Appl. No. 09/107,939, filed Jun. 30, 1998.

Lindholm et al., "The Java Virtual Machine Specification", Sep. 1996.

Case B: "Implementing The Java Virtual Machine Java's Complex Instruction Set Can Be Built in Software or Hardware," Microprocessor Report, vol. 10, No. 4, Mar. 25, 1996, pp. 12–17.

McNeley KJ et al., "Emulating a Complex Instruction Set Computer With a Reduced Instruction Set Computer," IEEE Micro, IEEE Inc. New York, US, vol. 7, No. 1, Feb. 1987, pp. 60–71.

Jean–Paul Billon, "JEFFWEG4 (J Executable File Format), Release 1.0 Achievements, Sep. 29, 2000," J Consortium Jeff Working Group, Online! Feb. 22, 2001, p. 1–24.

Jean–Paul Billon, "Executable File Format (JEFF) Specification, Draft," J Consortium Jeff Working Group, Online! Feb. 22, 2001, p. 1–43.

Patrice Pominville, "Annotating Java Bytecode," Project Report, McGill University, Online, Apr. 2000, pp. 1–7.

Matt T. Yourst, "Inside Java Class Files," Dr. Dobb's Journal, Jan. 1998.

Hummel et al., "Annotating the Java bytecodes in support of optimization," Concurrency: Practice and Exprerience, John Wiley and Sons, vol. 9(11), Nov. 1997, pp. 1003–1016.

Markus Dahm, "Byte Code Engineering" Freie University Berlin, 1999.

Meyer et al., "Java Virtual Machine" O'Reilly & Associates, Inc., 1997.

* cited by examiner

Constant Pool Section to Reference A Method

| | | |
|---|---|---|
| 10: | class_index=11, name_type_index=12 | CONSTANT_Methodref |
| 11: | name_index=13 | CONSTANT_Class_info |
| 12: | name_index=14, decsriptror_index=15 | CONSTANT_NameAndType |
| 13: | length, pointer to class name srting | CONSTANT_Utf6_info |
| 14: | length, pointer to method name srting | CONSTANT_Utf6_info |
| 15: | length, pointer to signature srting | CONSTANT_Utf6_info |
| 16: | | |

Fig. 1

Invoke$_x$_M (CP-Index)

Fig. 5B

Invoke$_{xavm}$_M (Reference M)

Fig. 5C

FRAMEWORKS FOR INVOKING METHODS IN VIRTUAL MACHINES

CROSS-REFERENCE TO RELATED APPLICATIONS

This application is related to U.S. patent application Ser. No. 09/703,356, entitled "IMPROVED METHODS AND APPARATUS FOR NUMERIC CONSTANT VALUE INLINING IN VIRTUAL MACHINES", filed concurrently herewith, and hereby incorporated herein by reference.

This application is related to U.S. patent application Ser. No. 09/703,449, entitled "IMPROVED FRAMEWORKS FOR LOADING AND EXECUTION OF OBJECT-BASED PROGRAMS", filed concurrently herewith, and hereby incorporated herein by reference.

BACKGROUND OF THE INVENTION

The present invention relates generally to frameworks for invoking methods in virtual computing machines. More specifically, the invention relates to frameworks for representing class files that facilitate the method invocation process within a virtual machine and to processes for creating such representations of a class file.

Recently, the Java™ programming environment has become quite popular. The Java™ programming language is an object-based high level programming language that is designed to be portable enough to be executed on a wide range of computers ranging from small devices (e.g., pagers, cell phones and smart cards) up to supercomputers. Computer programs written in the Java programming language (and other languages) may be compiled into Java virtual machine instructions (typically referred to as Java bytecodes) that are suitable for execution by a Java virtual machine implementation.

The Java virtual machine is commonly implemented in software by means of an interpreter for the Java virtual machine instruction set, but in general may be software, hardware, or both. A particular Java virtual machine implementation and corresponding support libraries, together constitute a Java™ runtime environment.

Computer programs in the Java programming language are arranged in one or more classes or interfaces (referred to herein jointly as classes or class files). Such programs are generally platform, i.e., hardware and operating system, independent. As such, these computer programs may be executed, unmodified, on any computer that is able to run an implementation of the Java™ runtime environment. A class written in the Java programming language is compiled to a particular binary format called the "class file format" that includes Java virtual machine instructions for the methods of a single class. In addition to the Java virtual machine instructions for the methods of a class, the class file format includes a significant amount of ancillary information that is associated with the class. The class file format (as well as the general operation of the Java virtual machine) is described in some detail in The Java Virtual Machine Specification by Tim Lindholm and Frank Yellin (ISBN 0-201-31006-6), which is incorporated herein by reference.

As described in The Java Virtual Machine specification, one of the structures of a standard class file is known as the "Constant Pool.". The Constant Pool is a data structure that has several uses. One of the uses of the Constant Pool that is relevant to the present invention is that the Constant Pool contains the information that is needed to resolve each method that can be invoked by any of the methods within the class. FIG. 1 (which may be familiar to those skilled in the art) is a representation of a Constant Pool section of a class file that contains the information necessary to uniquely identify and locate a particular invoked method.

Generally, when a class file is loaded into the virtual machine, the virtual machines essentially makes a copy of the class file for its internal use. The virtual machine's internal copy is sometimes referred to as an "internal class representation." In conventional virtual machines, the internal class representation is typically almost an exact copy of the class file and it replicates the entire Constant Pool. This is true regardless of whether multiple classes loaded into the virtual machine reference the same method and thus replicate some (or much) of the same Constant Pool information. Such replication may, of course, result in an inefficient use of memory resources. In some circumstances (particularly in embedded systems which have limited memory resources) this inefficient use of memory resources can be a significant disadvantage.

Additionally, conventional virtual machine interpreters decode and execute the virtual machine instructions (Java bytecodes) one instruction at a time during execution, e.g., "at runtime." To invoke a method referenced by a Java bytecode, the virtual machine must make access the Constant Pool simply to identify the information necessary to locate and access the method to be invoked. Again, this is inefficient. Such inefficiencies tend to slow the performance of the virtual machine. Accordingly, improved frameworks for invoking methods in virtual machines such as Java virtual machines would be very useful.

SUMMARY OF THE INVENTION

To achieve the foregoing and other objects of the invention, improved frameworks for implementing class files that are particularly useful in facilitating the method invocation process within a virtual machine will be described. In one aspect of the invention, a class file structure is described which associates one or more "reference cells" with the class file. Generally, each method within the class file (or an internal representation of the class file) may have an associated reference cell. The reference cells typically include sufficient information to facilitate the invocation of the corresponding method.

In one embodiment, each reference cell includes a class pointer field, a method name field and a signature field. The class pointer field can contains a reference to an internal class representation. The method name field contains or references the name of the associated method. The signature field contains or references a signature associated with the method. The reference cell may include other information as well. By way of example, some implementations may further include an information field and a link field. The information field is arranged to hold or reference information generated at runtime by the virtual machine. The link field contains information suitable for directly or indirectly linking the reference cell to the internal class representation.

In various preferred embodiments, the class file takes the form of an internal class representation suitable for direct use by a virtual machine. By way of example, the internal class representation may represent a Java class. In such embodiments, the internal class representation preferably does not include a Constant Pool.

In some preferred embodiments, the signature takes the form of an internal representation of a signature that is directly useable by the virtual machine at runtime. That is, the signature is stored in the reference cell in a form that does not require construction of the signature by the virtual machine.

In another aspect of the invention, a process for loading class files into a virtual machine based computing system is described. Each method invocation within a class file is translated into an internal method invocation that references a reference cell associated with the internal class representation that contains the method. The use of such reference cells has the potential in many circumstances to improve the performance of the virtual machine as well as to potentially reduce the memory requirements of the internal class representations.

In yet another aspect of the invention, a process for creating internal representations of a class file is described. In this aspect, each method invocation in a class file is reviewed to determine whether a reference cell currently exists for its associated method. When it is determined that a reference cell does not currently exist for a method associated with a selected method invocation, a new reference cell is created for the selected method. The newly created reference cell is then associated with the internal class representation that contains the method (which may or may not be different than the internal class representation that contains the method invocation). In various preferred embodiments, the internal class representation represents a Java class and does not include a Constant Pool.

BRIEF DESCRIPTION OF THE DRAWINGS

The present invention will be readily understood by the following detailed description in conjunction with the accompanying drawings, wherein like reference numerals designate like structural elements, and in which:

FIG. 1 is a representation of a Constant Pool section of a class file that contains the information necessary to uniquely identify and locate a particular invoked method.

FIG. 5B illustrates a conventional Java Method Invocation.

FIG. 5C illustrates a Java Method Invocation in accordance with one embodiment of the invention

DETAILED DESCRIPTION OF THE INVENTION

Figure 2:
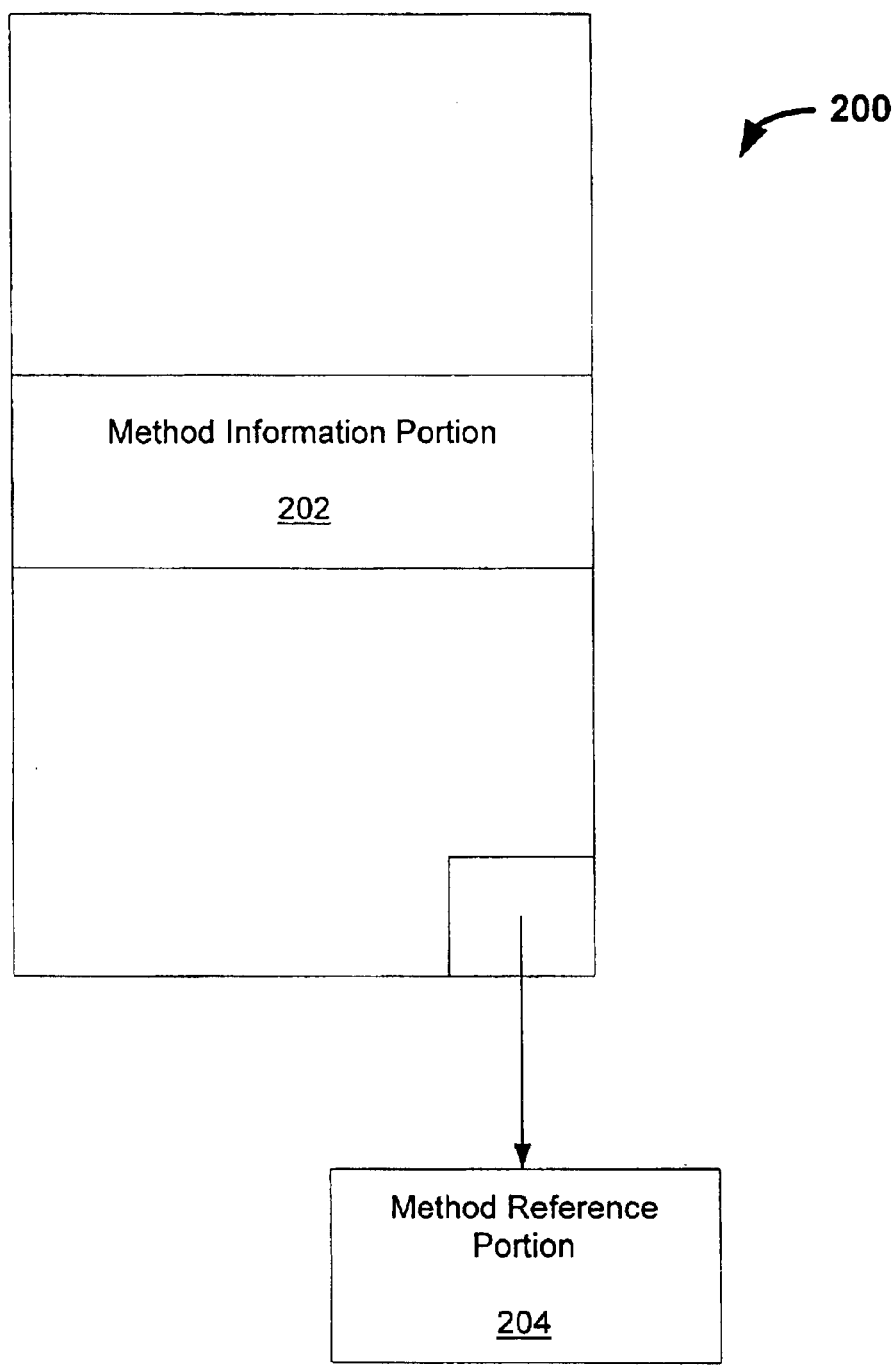
FIG. 2 is a block diagram of an internal class representation in accordance with one embodiment of the invention.

As described in the background section, the Java programming environment has enjoyed widespread success. Therefore, there are continuing efforts to extend the breadth of Java compatible devices and to improve the performance of such devices. One of the most significant factors influencing the performance of Java based programs on a particular platform is the performance of the underlying virtual machine. Accordingly, there have been extensive efforts by a number of entities to provide improved performance Java compliant virtual machines. In order to be Java compliant, a virtual machine must be capable of working with Java classes, which have a defined class file format. Although it is important that any Java virtual machine be capable of handling Java classes, the Java virtual machine specification does not dictate how such classes are represented internally within a particular Java virtual machine implementation.

The Java class file format utilizes the constant pool construct to store the information necessary to support method invocation. However, as suggested above, traversing the constant pool at runtime to obtain the information necessary to invoke a method is not particularly efficient. One aspect of the present invention seeks to provide a mechanism that will generally improve the runtime performance of virtual machines by eliminating the need to always traverse a constant pool at runtime to invoke particular methods. Conventionally, a significant amount of work has to performed at runtime in order to invoke a method. In effect, the described system contemplates doing some extra work during the loading of a class into a virtual machine by obtaining the method invocation information from the constant pool during loading and representing that information in a form that is more efficient at runtime.

In other aspects of the invention, specific data structures (i.e., internal representations of a class file) that are suitable for use within a virtual machine and methods for creating such internal representations of a class file are described. In one embodiment, the improved internal class representation includes a reference portion associated with the various methods that are contained within the class. The reference portion includes a plurality of reference cells, wherein each of the reference cells corresponds to a unique method associated with the class. The reference cells are used to store information necessary for a virtual machine to invoke their corresponding methods at run time. With this arrangement, methods can be invoked using reference cells without requiring constant pools to be traversed at runtime. Further, if the invention is implemented together with other improvements as described in concurrently filed, co-pending U.S. patent application Ser. No. 09/703,449, entitled "IMPROVED FRAMEWORKS FOR LOADING AND EXECUTION OF OBJECT-BASED PROGRAMS", the constant pool may not even need to be copied into the virtual machine's internal representation of the class file. Thus, the use of reference cells in conjunction with the improved techniques provided in accordance with the invention has the potential in many circumstances to improve the performance of the virtual machine as well as potentially reduce the memory requirements of the internal class representations.

Embodiments of the invention are discussed below with reference to FIGS. 2–6. However, those skilled in the art will readily appreciate that the detailed description given herein with respect to these figures is for explanatory purposes as the invention extends beyond these limited embodiments.

FIG. 2 is a block diagram of an internal class representation 200 in accordance with one embodiment of the invention. The internal class representation 200 can be, for example, implemented as a data structure embodied in a computer readable medium that is suitable for use by a virtual machine. As shown in FIG. 2, the internal class representation 200 includes a method information portion 202. The method information portion 202 is arranged to contain or reference information relating to one or more methods. The methods can be, for example, Java implemented methods. As will be appreciated, the method information portion 202 can be implemented in various ways, for example, as a table similar to a table of method information implemented in a standard Java class file.

In addition, the internal class representation 200 includes a method reference portion 204 associated with the methods contained within the internal class representation 200. The reference portion 204 is arranged to include any reference cell associated with the class. The method reference portion 204 can be implemented in a wide variety of different ways depending on the needs of a particular system. By way of example, in the described embodiment, the reference cells are linked together using a link-list construct. Each reference cell can include information that is useful in invoking a method.

It should be noted that reference cells can be created selectively (e.g., when it is certain and/or when it is likely that a method is to be invoked). Accordingly, in accordance with one embodiment of the invention, if a method does not appear to be invoked, reference cells corresponding to that method need not be created. As a result, processing time and memory space may further be improved.

Figure 3:
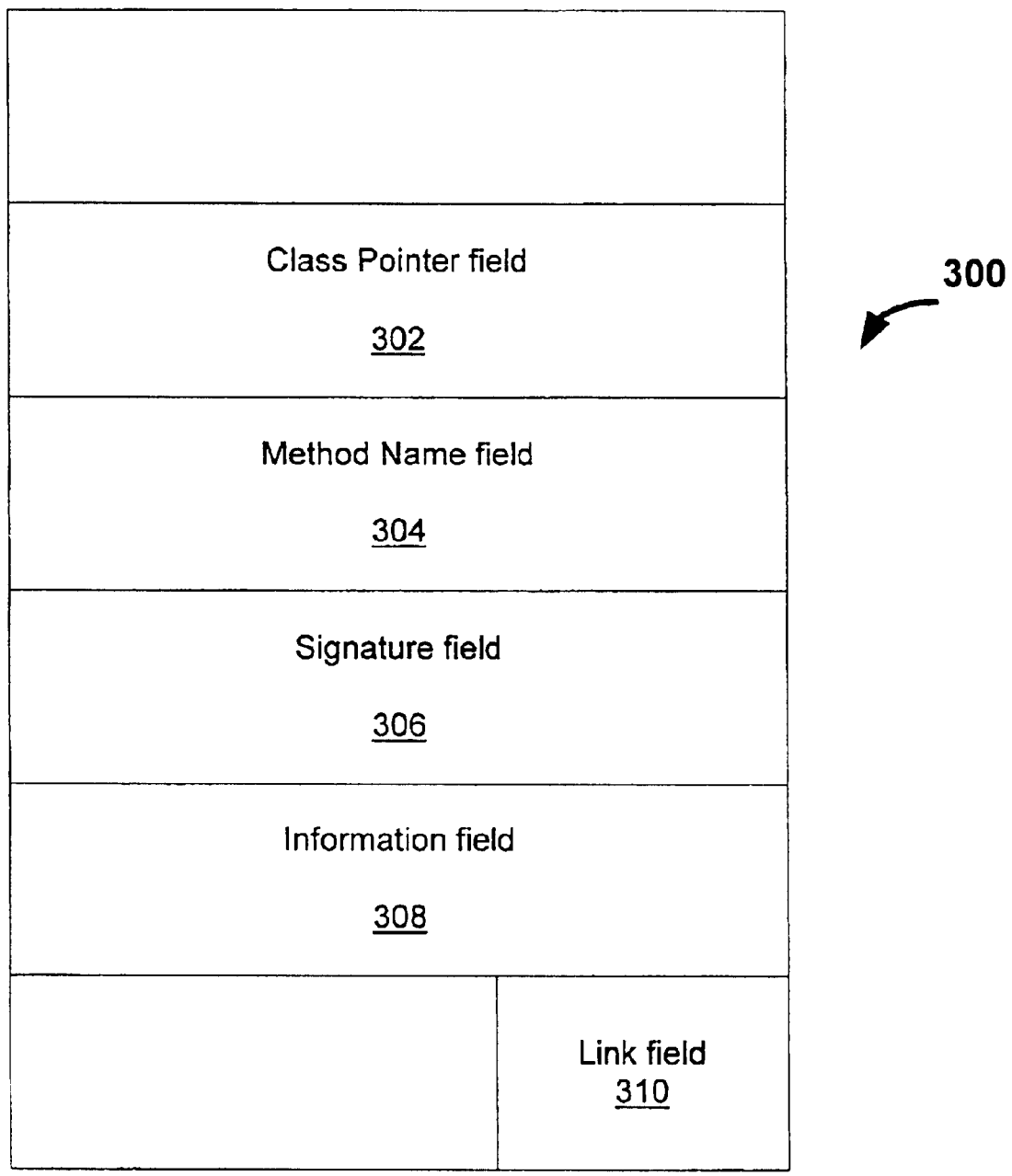
FIG. 3 is a diagrammatic representation of a reference cell in accordance with one embodiment of the present invention.

FIG. 3 is a diagrammatic representation of a reference cell 300 in accordance with one embodiment of the present invention. In the illustrated embodiment, the reference cell 300 includes a class pointer field 302, a method name field 304, a signature field 306, an information field 308, and a link field 310. Typically, a value stored in the class pointer field could reference (i.e. point to) an internal representation of class. The class may have one or more methods associated with it. A method can have a corresponding reference, for example, the reference cell 300. The method name field 304 is arranged to identify the name of a method associated with the class. This is typically done be storing the actual method name in the method name field 304. However again, this can also be accomplished by storing a pointer or index to the method name.

The signature field 306 is arranged to contain or reference a signature associated with the method corresponding the reference cell. The nature of the signature is well known to those familiar with method invocation in Java virtual machines. Typically, in most conventional Java virtual machines, the signature is constructed into a form usable by the virtual machine using a series of calls to the constant pool at runtime when the method is invoked. Although this works well, it is relatively slow. One advantage to including the signature in the reference cell is that a signature suitable for direct use by the virtual machine can be constructed during loading and either stored directly in the reference cell or stored in a location that is referenced by the reference cell. In the described embodiment, the reference cell contains a pointer or index to the signature rather than actually storing the signature simply because signatures can be relatively large and their relative sizes may vary significantly for different classes. In addition, references to signatures can be used across reference cells. Thus, referencing the signature tends to be a more efficient use of memory.

The information field 308 is arranged for containing or referencing information generated at runtime by the virtual machine. As will be appreciated by those skilled in the virtual machine art, there is often information associated with a method that the virtual machine desires to store at runtime. The information field 308 simply provides a place to either store such information, or to identify the location where such information can be or is stored.

In the illustrated embodiment, the reference cells are associated with their corresponding class using a link list construct. Thus, the link field 310 simply contains information suitable for directly or indirectly linking the reference cell 300 to the internal class representation and/or other associated reference cells.

As briefly discussed above, method invocations in standard Java class files take the form of a method invocation instruction followed by a data parameter which takes the form of an index into the constant pool. To execute a method invocation at runtime, the virtual machine (e.g. the virtual machine interpreter), must perform a number of steps which require multiple inquiries to the constant pool. With the framework described herein, much of this work can effectively be transferred to class loading by creating the described reference cell architecture during class loading.

Figure 4:
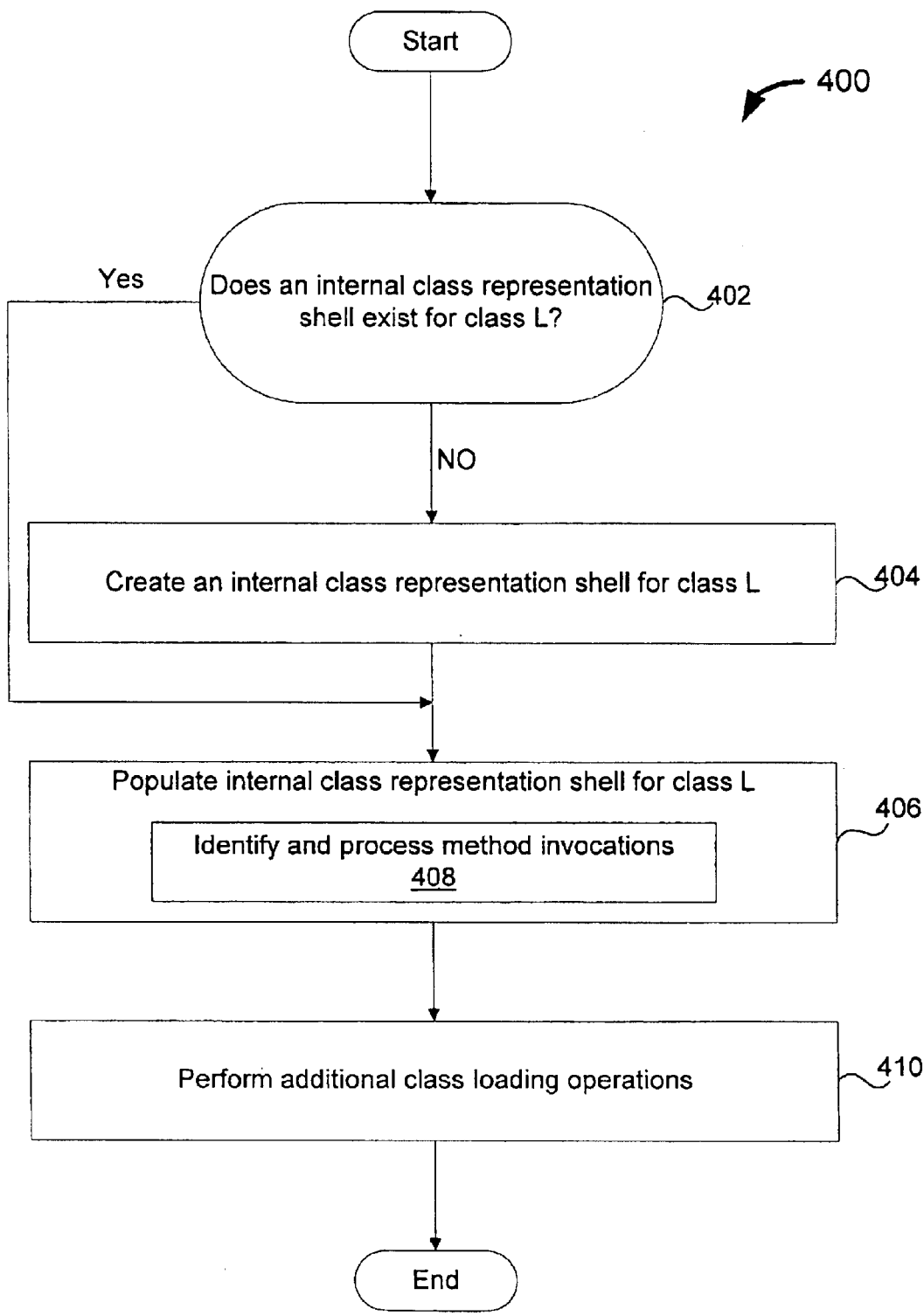
FIG. 4 illustrates an exemplary loading method for loading a class file in accordance with one embodiment of the invention.

FIG. 4 illustrates an exemplary loading method 400 for loading a class file in accordance with one embodiment of the invention. For the sake of illustration, in the described embodiment, the loading method 400 is used in a Java runtime environment to load a Java class file. Typically, this would be accomplished by a Java class loader. Initially, at operation 402, a determination is made as to whether an internal class representation shell exists for the class being loaded (e.g., a class L). If it is determined at operation 402 that an internal class representation shell does not exist for the class L, an internal class representation shell is created for class L in operation 404. However, if it is determined at operation 402 that an internal class representation shell exists for the class L, the loading method 400 skips operation 404 and proceeds directly to operation 406 where the internal class representation shell for class L is populated. In the disclosed embodiment, the class loader populates the internal class representation using any appropriate techniques. However, the method invocations are handled differently then method invocations are typically handled during loading in that the described reference cell framework is created. Populating the internal class representation performed at operation 406 can entail identifying and processing Method invocations (operation 408) which is illustrated in greater detail in FIG. 5. After the internal class representation has been populated, any other class loading related processing with respect to Class L is undertaken in operation 410 and the loading is completed. In one preferred embodiment, class loading may be performed, as described in concurrently filed, co pending U.S. patent application Ser. No. 09/703,449, entitled "IMPROVED FRAMEWORKS FOR LOADING AND EXECUTION OF OBJECT-BASED PROGRAMS".

Figure 5:
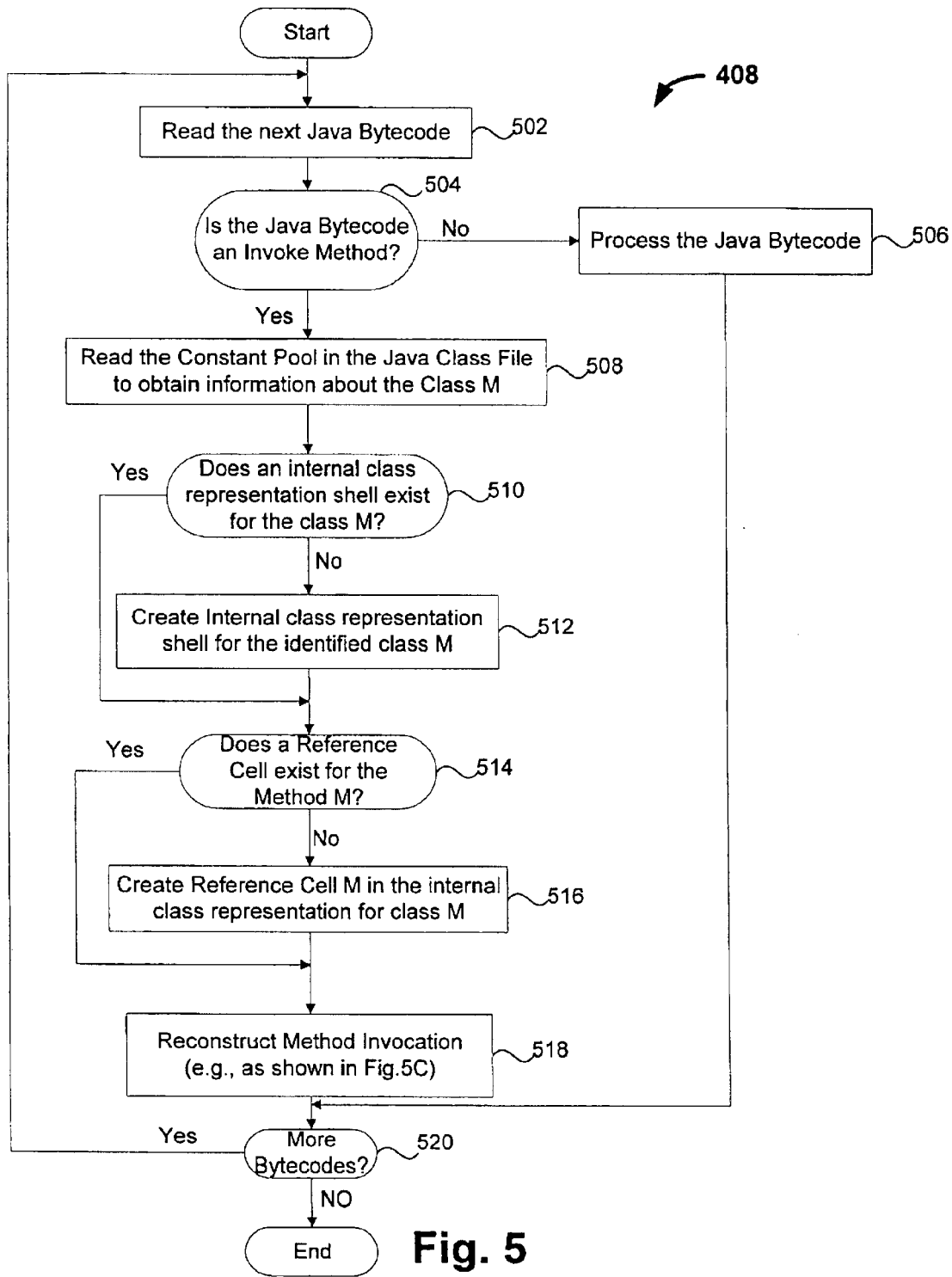
FIG. 5 the internal class representation illustrates a method for processing a method invocation in accordance with one embodiment of the invention.

Referring next to FIG. 5 the internal class representation illustrates a method 408 for processing a method invocation in accordance with one embodiment of the invention. The method 408 represents operations that can be performed at operation 408 of FIG. 4. It should be noted that the method 408 can be utilized by a virtual machine to process method invocations in a programming environment (e.g., Java programming environment). To illustrate, the processing method 408 will be described below with respect to a Java programming environment.

Initially, at operation 502, the next Java bytecode is read. Next, at operation 504, a determination is made as to whether the next Java bytecode is a method invocation, for example, a method invocation M for invoking a method M. As illustrated in FIG. 5B, the method invocation is typically a Java "invoke$_x$ M (cp-index)". "(cp-index)" is an index to a constant pool in a Java class file associated with a class M. Accordingly, "(cp-index)" is used to obtain information relating to the method M. This information includes class name, method name, and signature for a method M. If it is determined at operation 504 that the next Java bytecode is not a method invocation, the method 408 proceeds to operation 506 where the bytecode is processed. The method 408 then proceeds to operation 520 where a determination is made as to whether there is a Java bytecode to be read. If it is determined at operation 520 that there is at least one bytecode to read, the method 408 proceeds back to operation 502 where the next Java bytecode is read. However, if it is determined at operation 520 that there are no more bytecodes to read, the method 408 ends.

On the other hand, if it is determined at operation 504 that the next Java bytecode is a method invocation, the method 408 proceeds to operation 508 where the constant pool information from the Java class file for the Java class M is read. As noted above, the index (cp-index) of Java "invoke$_x$_M (cp-index)" can be used to obtain this information from the constant pool. It should be noted that the Java class M is a class associated with the method M. It should also be noted that class M is a class associated with a class that is to be loaded such as class L of the loading method 400 of FIG. 4.

At operation 510 a determination is made as to whether an internal class representation shell exists for the identified class M associated with the method M. If it is determined at operation 510 that an internal class representation shell does not exist for the identified class M, the method 408 proceeds to operation 512 where a class representation shell for the identified class M can be created. Following operation 512 or if it is determined at operation 510 that an internal class representation shell does exist for the identified class M, the method 408 proceeds to operation 514 where a determination is made as to whether a reference cell M exists for the identified method M. The reference cell M can be implemented, for example, in accordance with the reference cell 300 of FIG. 3. If it is determined at operation 514 that a reference cell M does not exist for the identified method M, the method 408 proceeds to operation 516 where a reference cell M for the identified method M is created. However, If it is determined at operation 514 that a reference cell M exists for the identified method M, the method 408 skips operation 516 and proceeds directly to operation 518 where the method invocation is reconstructed. As illustrated in FIG. 5C, a "Java invoke$_x$_M (cp-index)" instruction can be reconstructed to a invoke$_{AVM}$_M (reference M) instruction wherein the "reference M" is a reference (or pointer) to a reference cell associated with the method M. At operation 620 a determination is made as to whether there are more Java bytecodes to be read. If it is determined at operation 520 that there is a Java bytecode to be read, the method 408 proceeds back to operation 502 where the next Java bytecode is read. However, if there are no more bytecodes, the method 408 ends.

Figure 6:
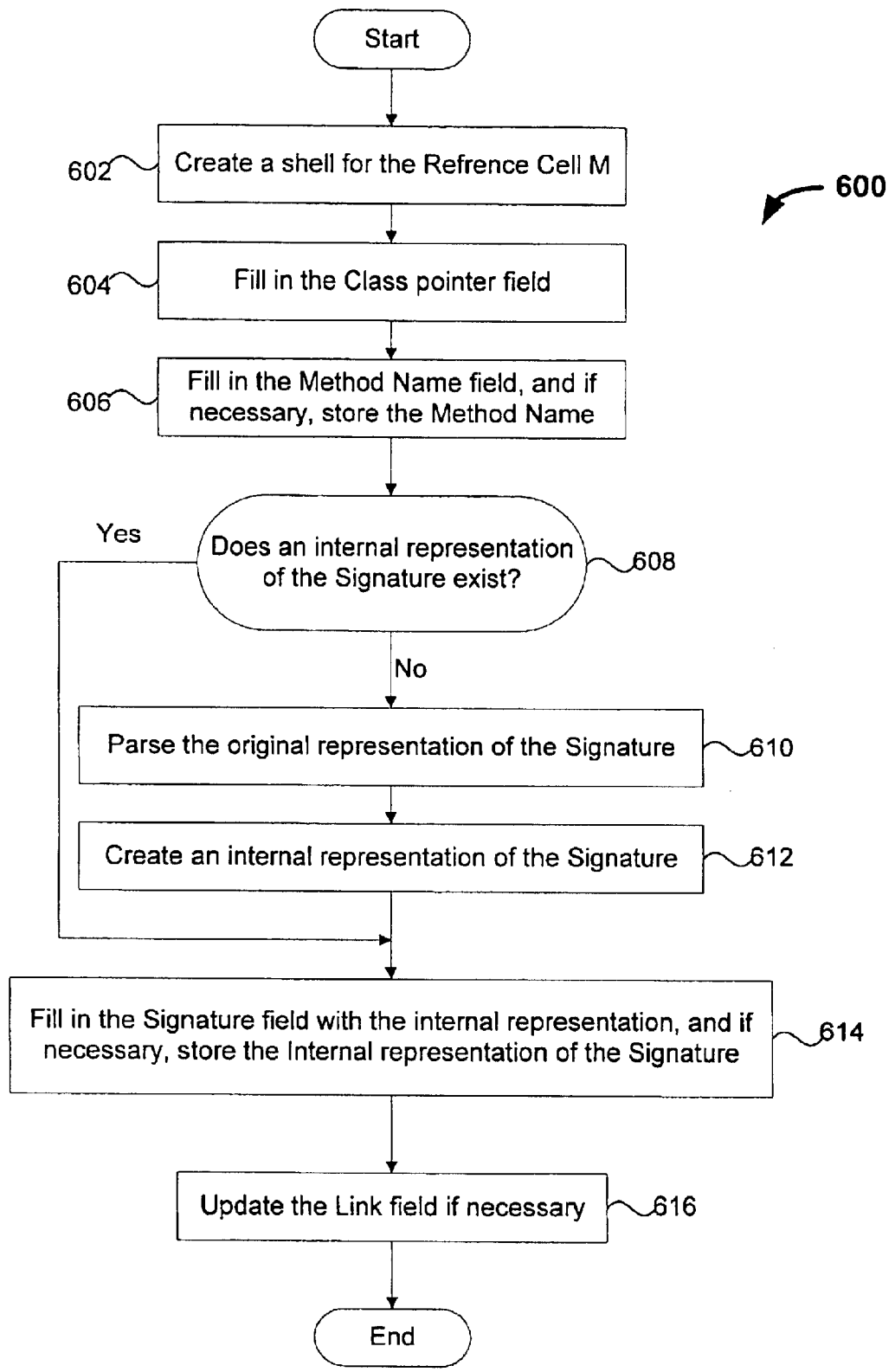
FIG. 6 illustrates a method for creating a reference cell in accordance with one embodiment of the present invention.

FIG. 6 illustrates a method 600 for creating a reference cell in accordance with one embodiment of the present invention. The method illustrates in greater detail operations that can be performed at operation 516 of FIG. 5. Initially, at operation 602, a shell for a reference cell M is created. Next, at operation 604, a class pointer field of a reference cell is filled with (or set to) the appropriate internal class representation. For example, as shown in FIG. 3, the reference cell M can be the reference cell 300 having a class pointer field 302.

At operation 606, the method name field of the reference cell is filled with (or set to) the appropriate method name for a method M associated with the class M. For example, referring back to FIG. 3, the method name field 304 can be filled with (or set to) the appropriate value, namely, the method name for the method M. As will be appreciated, if necessary, the appropriate method name can be stored.

Next, at operation 608, a determination is made as to whether an internal representation exists for the signature of the method associated with the cell reference. If it is determined at operation 608 that an internal representation does not exist for the signature of the method associated with the cell reference, the method 600 proceeds to operation 610 where the original representation of the signature is parsed. The original representation of the signature is typically found in a Java class file containing an invocation method M. At operation 612, an internal representation for the signature of the method associated with the cell reference is created. As will be appreciated, if necessary, the internal representation for the signature can be stored.

Following operation 612 or if it is determined at operation 608 that an internal representation exists for the signature of the method associated with the cell reference, the method 600 proceeds to operation 614 where the signature field of the reference cell M is filled with (or set to) the appropriate internal representation of the signature of method M. For example, referring back to FIG. 3, the signature field 306 can be filled with (or set to) the appropriate value, namely, the internal representation of the signature for the method M. As will be appreciated, if necessary, the internal representation of the signature of method M can be stored.

Following operation 616, if necessary, a link field of the reference cell M is updated. For example, referring back to FIG. 3, the link filed 308 of reference cell 300 of FIG. 3 is updated. The link filed of the reference cell M can, for example, be updated to point to another cell reference in a linked list of cell references. The method 600 end following operation 616.

It should be noted that it is not necessary for the internal class representations implemented in accordance with the invention to have constant pool portions. Furthermore, the information relating to a method can be generated at load time and provided in a reference cell to allow invocation of the method. In comparison to conventional internal class representation there is no a need to copy constant pools into a virtual machine. Furthermore, there is no need to access constant pools and perform various operations at run time to obtain the information necessary to resolve methods.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An internal class representation data structure embodied in a computer readable medium, the internal class representation being suitable for use by a virtual machine at runtime, the internal class representation comprising:
   a first method; and
   a reference cell that corresponds to the first method, the reference cell including,
      a class pointer field that can be used to locate an internal representation of a class,
      a method name field that contains or references the name of the first method, and
      a signature field that contains or references a signature associated with the first method.

2. An internal class representation data structure as recited in claim 1 wherein the reference cell further includes:
   an information field arranged for containing or referencing information generated at runtime by the virtual machine; and a link field arranged to contain information suitable for directly or indirectly linking the reference cell to the internal class representation.

3. A data structure as recited in claim 2 wherein the reference cells are connected using a linked list construct.

4. A data structure as recited in claim 1 further comprising a plurality of said methods and a plurality of said reference cells, wherein each reference cell corresponds to a unique one of the methods.

5. A data structure as recited in claim 1 wherein the signature is an internal representation of a signature that is directly usable by the virtual machine at runtime.

6. A virtual machine that includes a plurality of internal class representations as recited in claim 1.

7. A virtual machine as recited in claim 6, wherein at least some of the methods are invoked from multiple different internal class representations, but only one reference cell is provided for each unique method.

8. A virtual machine as recited in claim 7 wherein each internal class representation represents a Java class and does not include a Constant Pool.

9. An internal class representation data structure as recited in claim 1, wherein the internal class representation represents a Java class and does not include a Constant Pool.

10. An internal class representation data structure as recited in claim 1, wherein the first method is likely to be invoked.

11. An internal class representation data structure as recited in claim 1, wherein the first method is certain to be invoked.

12. In a virtual machine based computing system that uses internal class representations to represent class files, a process of loading a class files into the computing system comprising:

populating a first internal class representation that corresponds to the class file, wherein the populated first internal class representation includes at least one internal method invocation suitable for invoking an associated method;

reviewing at least one method invocation to determine whether a reference cell currently exists for its associated method, wherein when it is determined that a reference cell does not currently exist for a selected method associated with the method invocation, the process further comprises creating a new reference cell for the selected method, the newly created reference cell being associated with an internal class representation that contains the invoked method.

13. A process as recited in claim 12, wherein said reviewing is performed only when the at least one method is likely to be invoked.

14. A process as recited in claim 12, wherein said reviewing is performed only when the at least one method is likely or certain to be invoked.

15. A process as recited in claim 12, wherein the loaded class file further includes a Constant Pool and at least one class file method invocation that references the Constant Pool, the process further comprising translating each class file method invocation into an associated internal method invocation that references a selected reference cell associated with the internal class representation that contains the method corresponding to the method invocation.

16. A process as recited in claim 12, wherein the computing system includes a virtual machine that utilizes the internal class representation to represent Java classes.

17. A process as recited in claim 12, wherein the internal class representation that contains the invoked method is different from the first internal class representation.

18. A process as recited in claim 12, wherein the internal class representation that contains the invoked method is the first internal class representation.

19. In a virtual machine based computing system that uses internal class representations to represent class files, a process of loading a class file that includes a Constant Pool and at least one method invocation that references the Constant Pool into the computing system, the process comprising translating at least one method invocation into an internal invocation that references a reference cell associated with the internal class representation that contains the method.

20. A process as recited in claim 19, wherein said converting is performed for each method invocation that is likely to be invoked.

21. A process as recited in claim 19, wherein said reviewing is performed for each method invocation that is likely to be invoked.

22. A process as recited in claim 19, wherein said converting is performed only for each method invocation that is likely to be invoked.

23. A process as recited in claim 19, wherein said reviewing is performed only for each method invocation that is likely or certain to be invoked.

* * * * *